(12) United States Patent
Kovacs

(10) Patent No.: US 6,560,062 B1
(45) Date of Patent: May 6, 2003

(54) RECORDING AND/OR REPRODUCING DEVICE HAVING COMPACT DRIVE MEANS FOR ACTUATING MEANS FOR THE ACTUATION OF HOLDER MEANS FOR A CASSETTE

(75) Inventor: Ernst Kovacs, Traiskirchen (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/437,482

(22) Filed: Nov. 10, 1999

(30) Foreign Application Priority Data

Nov. 12, 1998 (EP) .............................................. 98890338

(51) Int. Cl.⁷ .............................................. G11B 15/26
(52) U.S. Cl. .................................................. 360/96.5
(58) Field of Search ......................... 360/96.5, 93, 95, 360/96.3, 96.4; 242/339, 340, 348, 349, 338.4, 352.1

(56) References Cited

U.S. PATENT DOCUMENTS 5,572,498 A * 11/1996 Choi ........................ 369/75.2
5,600,508 A * 2/1997 Choi ........................... 360/85
5,943,181 A * 8/1999 Son et al. .................... 242/332
6,095,445 A * 8/2000 Hentrich ................... 242/332.4

FOREIGN PATENT DOCUMENTS

WO    WO9844499    10/1998    ........... G11B/15/67

* cited by examiner

*Primary Examiner*—William Korzuch
*Assistant Examiner*—Jennifer M. Dolan
(74) *Attorney, Agent, or Firm*—Aaron Waxler

(57) ABSTRACT

A recording and/or reproducing device (1) includes a holder (46) for holding a cassette (3), the holder (46) being guided so as to be movable between a loading position and an operating position along a substantially L-shaped path of movement, the cassette (3) being insertable into the holder (46). The recording and/or reproducing device further includes a record carrier drive mechanism (52) by which the record carrier (26) accommodated in the cassette (3) can be driven when the holder (46) has been moved to the operating position, and further includes a drive device (103) for driving and moving the holder (46), the drive device (103) including a ring-shaped drive wheel (127) which surrounds the record carrier drive mechanism (52) at the level of the ring-shaped drive wheel (127).

4 Claims, 12 Drawing Sheets

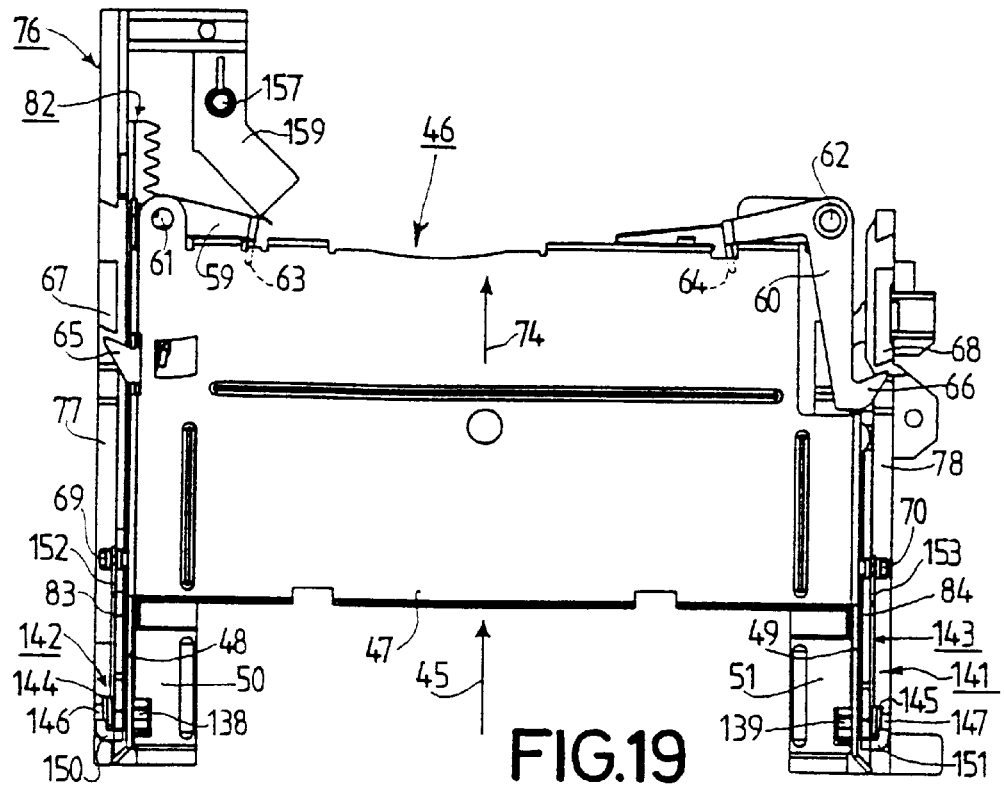
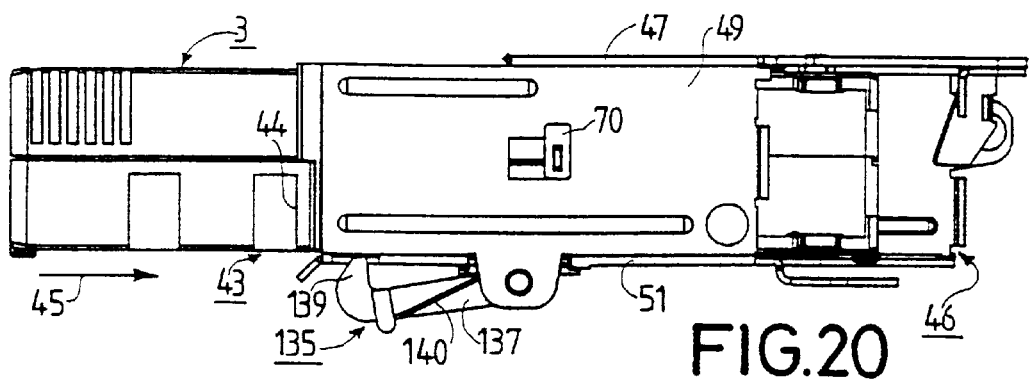
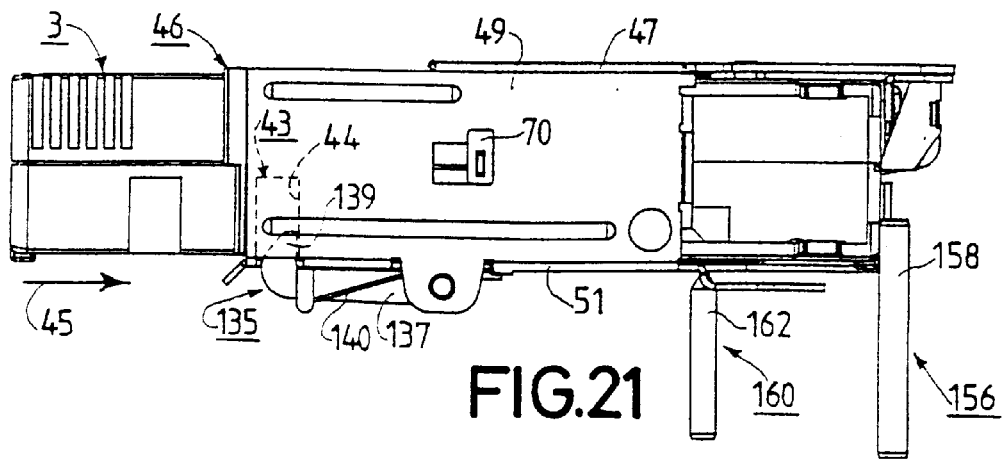

RECORDING AND/OR REPRODUCING DEVICE HAVING COMPACT DRIVE MEANS FOR ACTUATING MEANS FOR THE ACTUATION OF HOLDER MEANS FOR A CASSETTE

BACKGROUND OF THE INVENTION

1. Field of the Invention

The invention relates to a recording and/or reproducing device, into which a cassette can be loaded, this cassette comprising a housing and a drivable record carrier accommodated in the housing, the record carrier being driven by record carrier drive means for driving the record carrier through a side wall of the housing, the recording and/or reproducing device comprising holder means for holding the cassette, the holder means being guided so as to be movable between a loading position, in which the cassette is loaded into the holder means, and an operating position, in which the cassette occupies an operating position, actuating means coupled to the holder means, the actuating means being movable parallel to a direction of movement for causing the holder means to be moved between their loading position and their operating position, and record carrier drive means for driving the record carrier of the inserted cassette, said record carrier drive means being in driving engagement with the record carrier through the bottom wall of the cassette when the holder means together with the inserted cassette occupies the operating position.

2. Description of the Related Art

Such a recording and/or reproducing device is known, for example, from International Patent Application WO 98/44499 A1, corresponding to U.S. patent application Ser. No. 09/054,109, filed Apr. 2, 1998. In the known recording and/or reproducing device, the actuating means basically comprising a U-shaped actuating slide having two limb walls which extend parallel to two side walls of an inserted cassette, and a web wall which extends parallel to the bottom wall of an inserted cassette, the web wall being formed with an opening for the passage of the record carrier drive means, which is formed by reel drive means for driving a supply reel for a magnetic tape forming the record carrier. By means of said actuating slide, it is possible to achieve a trouble-free and satisfactory actuation of the holder means, but in the known recording and/or reproducing device, the actuating slide must be actuated by hand, which, during loading of a cassette into the known recording and/or reproducing device, is effected by manually inserting a cassette into the holder means, and, during removal of a cassette from the known recording and/or reproducing device, is effected by the manual actuation of an eject button. These manual actuations are not particularly convenient, and also impose an undesired limitation because the necessity of a manual actuation does not allow for remote control.

In order to preclude the afore-mentioned problems, it is common practice to include drive actuating means which serve for the actuation of holder means for a cassette by means of a motor.

SUMMARY OF THE INVENTION

It is an object of the invention to preclude the aforementioned problems, in that in a recording and/or reproducing device of the type defined in the opening paragraph, motor drive means drive means is provided which is of such a construction that only a minimal space is required.

According to the invention, the object is achieved in a recording and/or reproducing device of the type defined in the opening paragraph, in that the actuating means includes two actuating slides which extend parallel to the direction of movement, one actuating slide being situated at one side with respect to the record carrier drive means, and the other actuating slide being situated at the other side with respect to the record carrier drive means, and said recording and/or reproducing device further comprises drive means having a motor and a ring-shaped drive wheel drivable with the aid of the motor, the ring-shaped drive wheel being disposed between the two actuating slides of the actuating means, and the ring-shaped drive wheel lying around the record carrier drive means at the level of the ring-shaped drive wheel.

By taking the measures in accordance with the invention, it is achieved that the actuating means and, consequently, the holder means for the cassette can be actuated with the aid of the drive means in a motor-driven fashion, and that the construction is such that the object can be achieved with a particularly small overall height, namely, because the measures in accordance with the invention allow both the record carrier drive means and the drive means for the actuating means to be arranged at substantially the same level. For such recording and/or reproducing devices, this is advantageous and important because such recording and/or reproducing devices often take the form of so-called plug-in units whose overall height is comparatively small.

In the recording and/or reproducing device, the drive means may include a ring-shaped friction wheel which is directly in driving engagement with a friction lining of an actuating slide and which is in driving engagement with a friction lining of the other actuating slide via an intermediate friction wheel for direction reversal. Alternatively, the drive means may include a drive ring which cooperates with the actuating slides of the actuating means via two cable systems. However, it has proven to be particularly advantageous if each of the actuating slides of the actuating means includes a gear rack, the gear racks each being driven by a ring-shaped gear wheel.

The above-mentioned as well as further aspects of the invention will become apparent from the embodiments described hereinafter by way of example and will be elucidated with reference to these examples.

BRIEF DESCRIPTION OF THE DRAWINGS

The invention will now be described in more detail with reference to the drawings, which show two embodiments given by way of example but to which the invention is not limited. In the drawings:

FIG. 19 is a plan view showing the holder means of FIGS. 17 and 18;

FIG. 20 is a side view showing the holder means of FIGS. 17, 18 and 19 and a cassette inserted partly into the holder means;

FIG. 21, in a manner similar to FIG. 20, shows the holder means and a cassette wholly inserted into the holder means;

DESCRIPTION OF THE PREFERRED EMBODIMENTS

Figure 1:
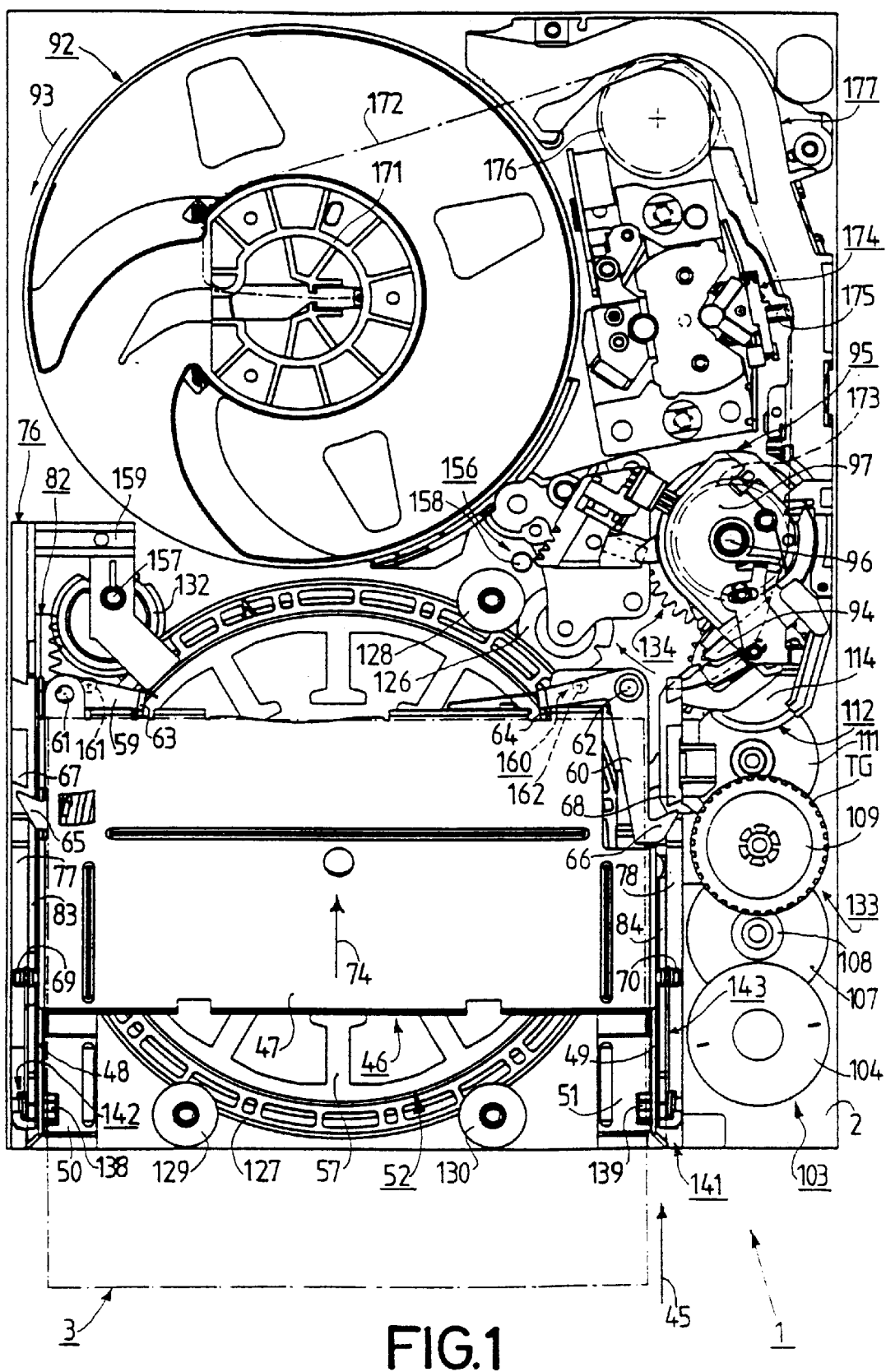
FIG. 1 is a top view of a storage device formed by a recording and reproducing device in accordance with a first embodiment of the invention, into which a cassette can be loaded as a storage container.

FIG. 1 shows a recording and reproducing device 1 in accordance with an embodiment of the invention, which forms a storage device for the storage of digital data on a storage medium, i.e., a magnetic tape, and which can also be regarded as a processing device for the processing of a processable medium, i.e., a magnetic tape, accommodated in a container, i.e., a cassette, the processing consisting of driving the medium, i.e., the magnetic tape. Hereinafter, the recording and reproducing device is briefly referred to as the device 1. The device 1 has a chassis 2, shown only diagrammatically, for carrying a multitude of component parts of the device 1. A cassette 3, shown in dash-dot lines in FIG. 1, can be loaded into the device 1. Hereinafter, the construction of the cassette 3 will first be described with reference to FIGS. 2, 3 and 4.

The cassette 3 has a housing 4, which comprises a lower housing half 5 and an upper housing half 6. With the housing halves 5 and 6 joined to one another, i.e., when the housing 4 is closed, the housing 4 has an upper wall 7 and a bottom wall 8, a front side wall 9, a rear side wall 10, a left-hand side wall 11 and a right-hand side wall 12. A grip portion 13 has been provided in the rear area of the upper wall 7, and a grip portion 14 has been provided in the rear area of the bottom wall 8.

In the area of the front side wall 9, the cassette has positioning means 15 comprising a first positioning location 16 and a second positioning location 17. The first positioning location 16 has two positioning walls 19 and 20 which project from the front side wall 9 towards the cassette interior, which are inclined towards one another, and which bound a wedge-shaped recess 18. The recess 18, bounded by the two positioning walls 19 and 20, is open towards the bottom wall 8. As is apparent from FIG. 4, the recess 18, bounded by the two positioning walls 19 and 20, has a bounding wall 21 which extends parallel to the upper wall 7 and to the bottom wall 8, and is situated at a given distance from the upper wall 7 of the cassette 3. The second positioning location 17 is defined by a positioning portion 22 of the front side wall 9. The positioning means 15 of the cassette, i.e., the two positioning walls 19 and 20 of the wedge-shaped recess 18 and the positioning portion 22 of the front side wall 9, serves for positioning the cassette 3 when it is moved inside the device 1, as will be described in more detail hereinafter.

Figure 2:
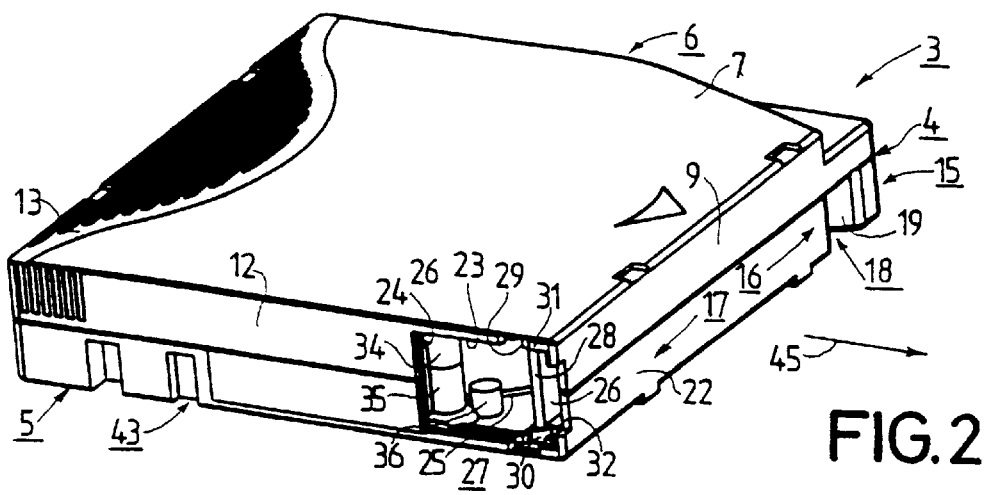
FIG. 2 is an oblique top view of the cassette which can be loaded into the recording and reproducing device of FIG. 1 as a storage container, the cassette accommodating a record carrier in the form of a tape as storage medium, namely, a magnetic tape, a coupling pin being provided at a free end of the magnetic tape.
Figure 3:
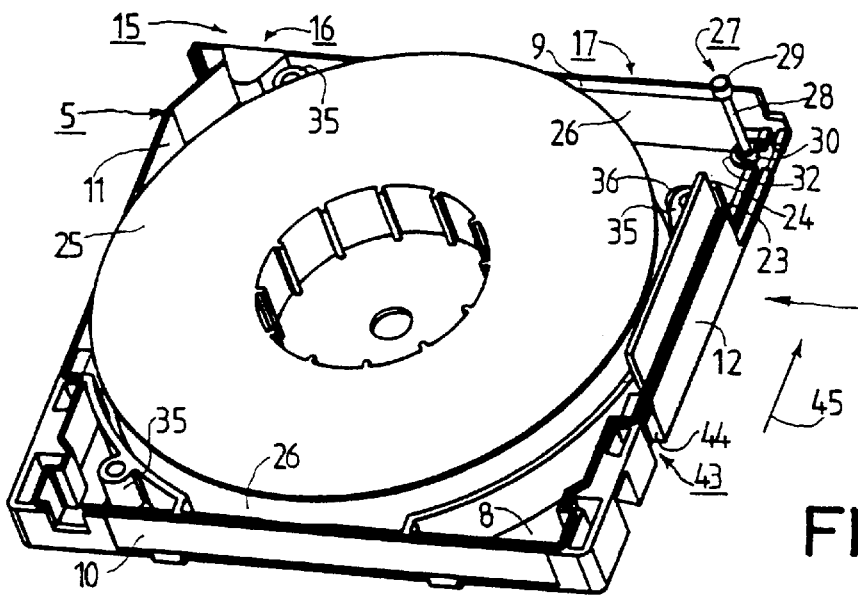
FIG. 3 is an oblique top view showing the cassette of FIG. 2 with the upper half of the housing removed.

In the right-hand side wall 12, the cassette 3 has an access opening 23, which can be closed by means of a shutter 24, but which is shown in its open position in FIG. 2 and in FIG. 3, the shutter 24 being brought automatically into the open position when the cassette 3 is loaded into the device 1.

The cassette 3 accommodates a rotationally drivable supply reel 25, as can be seen in FIG. 3. The cassette 3 further accommodates a record carrier in the form of a tape, in the present case a magnetic tape 26, wound on the reel hub of the supply reel 25. The cassette 3 further includes a coupling element 27 formed by a coupling pin 27 connected to a free end portion of the magnetic tape 26. The coupling pin 27 has a comparatively thin central portion 28, and an upper first end portion 29 and a lower second end portion 30, both end portions 29 and 30 having a larger diameter than the central portion 28.

In the cassette 3, the coupling pin 27 is held in a coupling position, namely, by two positioning forks 31 and 32 which cooperate with the two end portions 29 and 30 of the coupling pin 27. Furthermore, at least one retaining element, not shown in the Figures, may be provided, this retaining element being movable between a retaining position and a release position and by means of which a mechanism can be actuated, this retaining element being held in its release position by means of the mechanism upon entry of the coupling pin 27 into the cassette 3, and is subsequently moved into its retaining position and engages behind the coupling pin 27. The two end portions 29 and 30 are then held in the positioning forks 31 and 32 by means of the retaining element, as a result of which the coupling position of the coupling pin 27 is accurately defined.

The two housing halves 5 and 6 of the housing 4 are secured to one another by means of three screws 33. The screws 33 fit into hollow cylindrical connecting posts 34 and 35, the hollow cylindrical connecting posts 34 and 35 being visible through the access opening 23 in FIG. 2.

Figure 4:
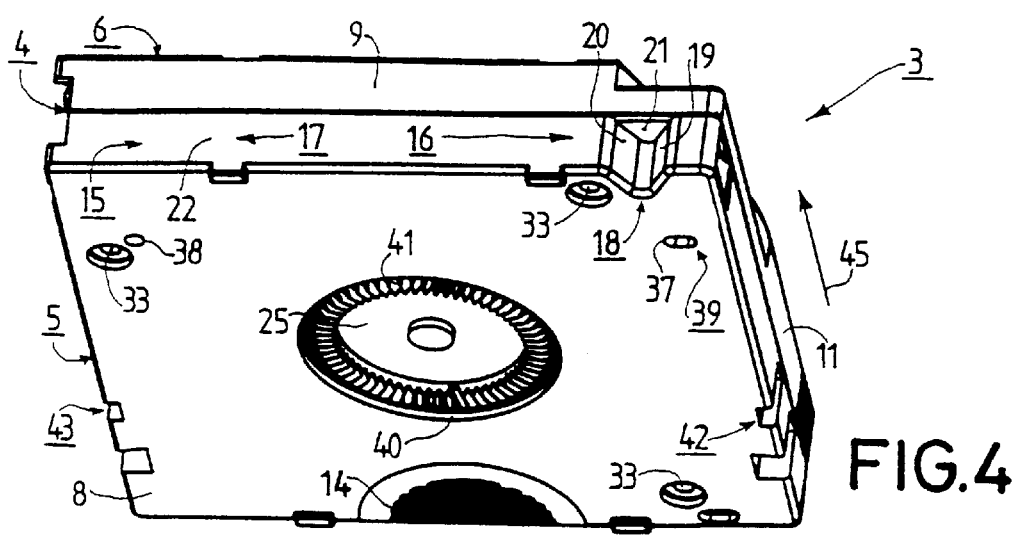
FIG. 4 is an underneath view of the cassette shown in FIGS. 2 and 3.
Figure 5:
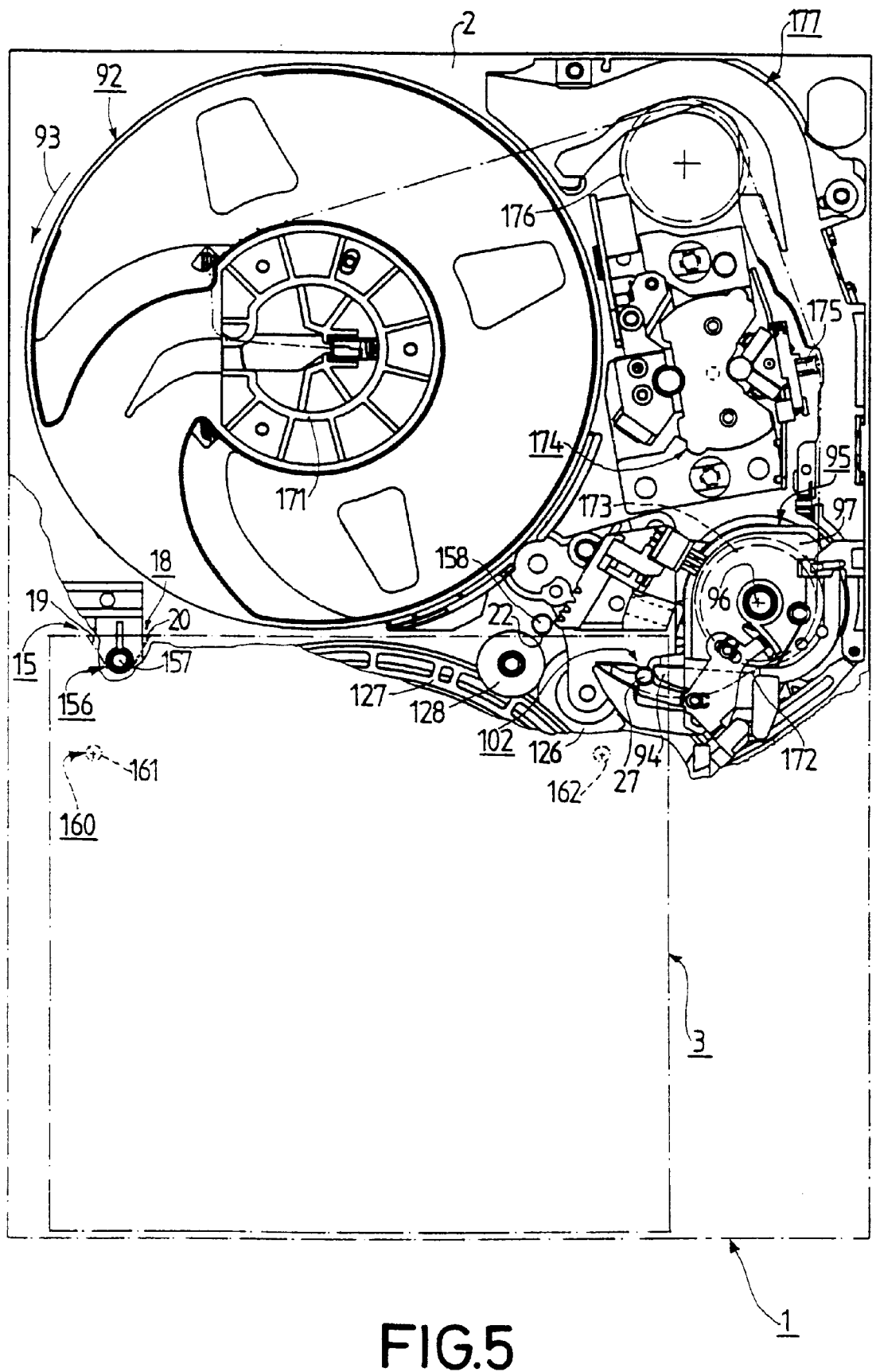
FIG. 5 shows the recording and reproducing device of FIG. 1 in basically the same way as FIG. 1 but only in part, the inserted cassette being in an operating position, and a pull-out element of the device being coupled to the coupling pin of the cassette so as to form a pull-out assembly.

The cassette 3 further has two positioning posts which project from the bottom wall 8 into the cassette interior, a positioning post 36 being visible through the access opening 23 in FIG. 2. Each of the positioning posts 36, as is shown in FIG. 4, has a blind hole which serve as final positioning holes 37 and 38 for definitely positioning the cassette 3 can be positioned definitively in the device 1 when the cassette 3 assumes its operating position in the device 1, as will be described in more detail hereinafter. The first final positioning hole 37 has an elongate cross-sectional shape. The second final positioning hole 38 is of circular cross-section. The two final positioning holes 37 and 38 together form the final positioning means 39 of the cassette.

In the bottom wall 8, a circular aperture 40 has been formed, through which drive teeth 41 of the supply reel 25 can be accessed by a reel drive device of the device 1 for rotationally driving the supply reel 25 is rotationally drivable.

The cassette 3 further has a first locking recess 42 and a second locking recess 43. The two locking recesses 42 and 43 are open towards the bottom wall 8 of the cassette 3. For each of the two locking recesses 42 and 43, the bounding wall situated nearest the front cassette wall 9 forms a locking wall 44, only a locking wall 44 of the second locking recess 43 being visible in Figure (see FIGS. 3, 20 and 21).

It is to be noted that the cassette 3, can be inserted into the device 1 in a direction of insertion indicated by an arrow 45 in the FIGS. 1, 2, 3, 4, 17, 18, 19, 20, 21, 22, 23, 24, 25, 26 and 27. Insertion may also be referred to as introduction or loading.

Figure 28:
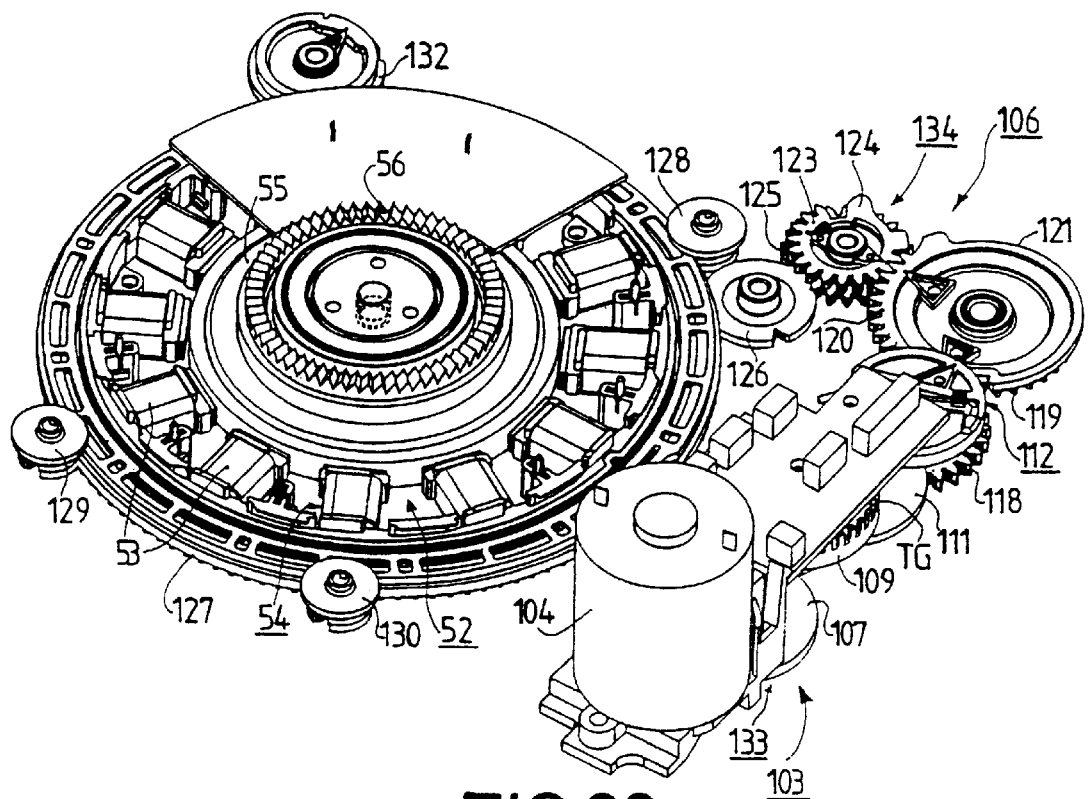
FIG. 28 is an oblique plan view showing a reel drive device of the recording and reproducing device as shown in FIG. 1, the supply reel accommodated in the cassette is rotationally drivable by the reel drive means.

For holding the cassette 3 the device 1 has holder means 46 formed by a cassette holder 46. The cassette holder 46 is essentially box-shaped and comprises an upper holder wall 47, and two holder side walls, i.e., a left-hand holder side wall 48 and a right-hand holder side wall 49, which are integral with the upper holder wall 47 and project from the upper holder wall 47 towards the chassis 2, as well as two holder bottom wall portions, i.e., a left-hand holder bottom wall portion 50 and a right-hand holder bottom wall portion 51, which project from the holder side walls 48 and 49 and which extend towards one another. The two holder bottom wall portions 50 and 51 are spaced at such a distance from one another that there is adequate room for a reel drive device 52 of the device 1, shown in FIG. 28, between the two holder bottom wall portions 50 and 51.

Figure 6:
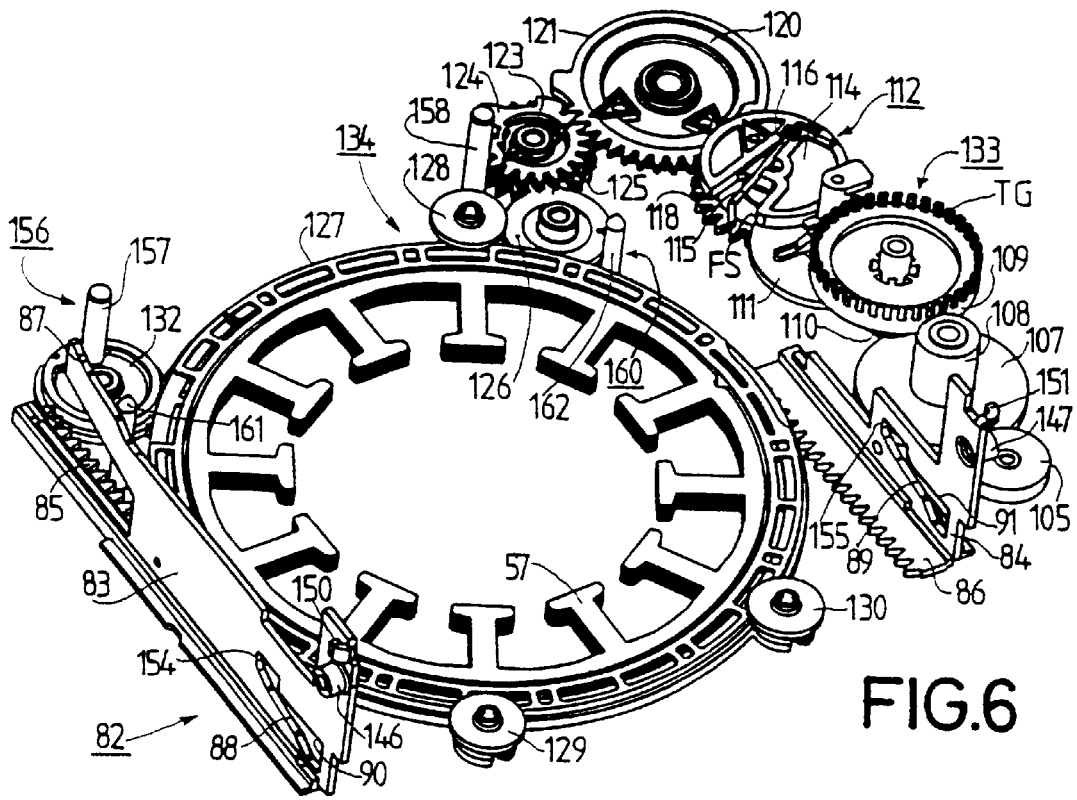
FIG. 6 is an oblique plan view showing drive means of the recording and reproducing device of FIG. 1, the drive means being adapted to actuate retaining means for the pull-out element and to actuate holder means for holding a cassette.
Figure 7:
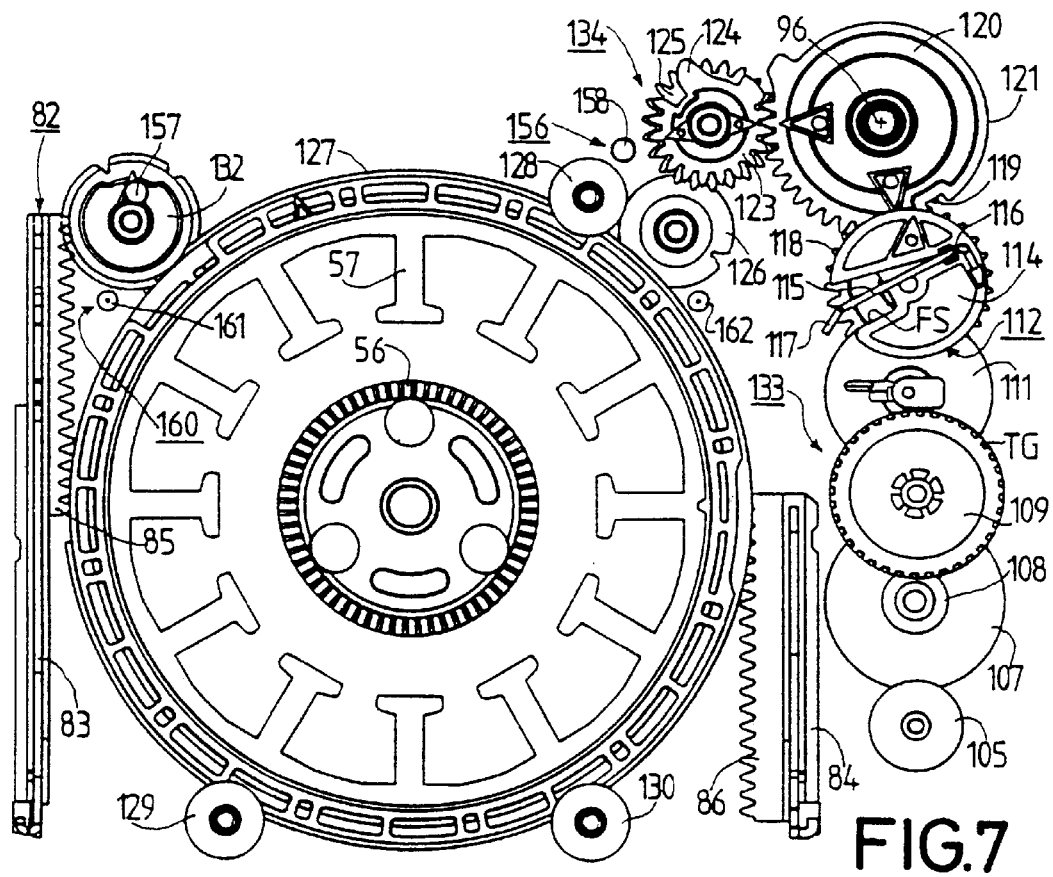
FIG. 7 is a plan view showing the drive means of FIG. 6.

The reel drive device 52 forms record carrier drive means and includes a drive motor M comprising a stator 54, having a plurality of stator coils 53, and a rotor 55 which cooperates with the stator 54 and which is coupled to drive teeth 56 in order to drive said drive teeth 56. By means of the drive teeth 56 of the reel drive device 52, the drive teeth 51 of the supply reel 25 of the cassette 3 can be driven. FIGS. 1, 6 and 7 only show the stator lamination assembly 57 of the stator 54 of the reel drive device 52 to represent the whole reel drive device 52.

Figure 17:
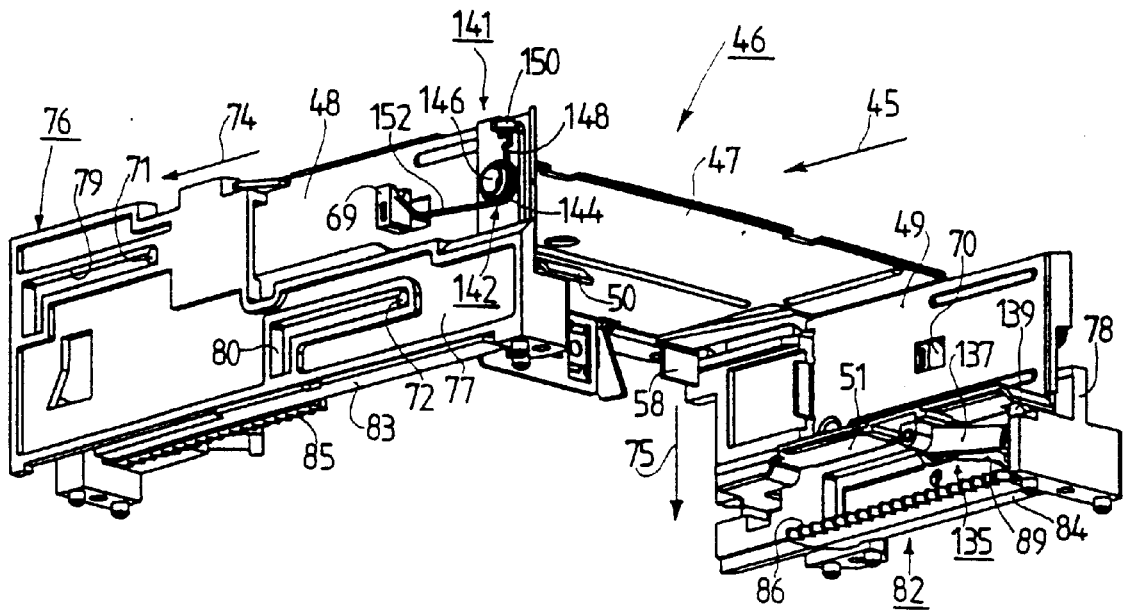
FIG. 17 shows the holder means of the recording and reproducing device of FIG. 1 in an oblique view from underneath.

The cassette holder 46, see FIG. 17, comprises two insertion-limiting limbs 58 which project from its upper holder wall 47 towards the chassis 2, an insertion limiting limb 58 being visible in FIG. 17. When a cassette 3 is inserted into the cassette holder 46, the front side wall 9 of the cassette 3 abuts against the insertion limiting limb 58, after which the cassette holder 46 is moved in the direction of insertion 45 by means of the manually-inserted cassette 3.

The cassette holder 46 further comprises, see FIGS. 1 and 19, a first latching lever 59 and a second latching lever 60, which are supported on the cassette holder 46 so as to be pivotable about respective pivots 61 and 62. Each of the latching levers 59 and 60 has a sensing portion 63 or 64, respectively. The sensing portions 63 and 64 project into the holder space of the cassette holder 46, as a result of which, the sensing portions 63 and 64 are moved against the action of springs, not shown, at the end of the insertion of a cassette 3. As a result-of such a movement, the latching hooks 65 and 66 provided on the latching levers 59 and 60 are pivoted towards one another and are thus moved away from two latching projections 67 and 68 so far that during a subsequent movement of the cassette holder 46 in the direction of insertion 45, the latching hooks 65 and 66 can no longer enter into latching engagement with the latching projections 67 and 68. The latching projections 67 and 68 each project from a guide wall to be described hereinafter. The latching levers 59 and 60 guarantee that the cassette holder 46 cannot be moved in the direction of insertion 45 if no cassette 3 is present in the cassette holder 46, or has not been inserted fully into cassette holder 46.

The cassette holder 46 further comprises two stops 69 and 70, see FIGS. 1 and 17 to 27. The first stop 69 is connected to the left-hand holder side wall 48, the first stop 69 projecting outwardly from the left-hand holder side wall 48.

Likewise, a second stop 70 is connected to the right-hand holder side wall 49. The two stops 69 and 70 are adapted to cooperate with spring means, which will be described in more detail hereinafter.

The cassette holder 46 further comprises three holder pins 71, 72 and 73 in total, see FIGS. 17, 18 and 22 to 27. The first holder pin 71 and the second holder pin 72 project outwardly from the left-hand holder side wall 48. The third holder pin 73 projects outwardly from the right-hand holder side wall 49. The three holder pins 71, 72 and 73, are provided both for guiding purposes and for actuating purposes. Thus, the three holder pins 71, 72 and 73 form guide pins as well as actuating pins.

Figure 22:
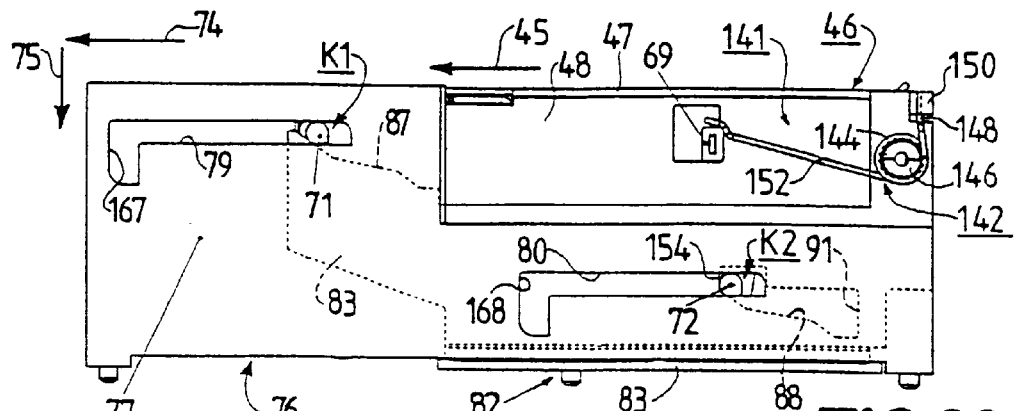
FIG. 22 is a side view showing a part of the recording and reproducing device of FIG. 1, which includes a guide wall, an actuating slide and the holder means, the holder means being shown in the loading position, and no cassette being present in the holder means.
Figure 23:
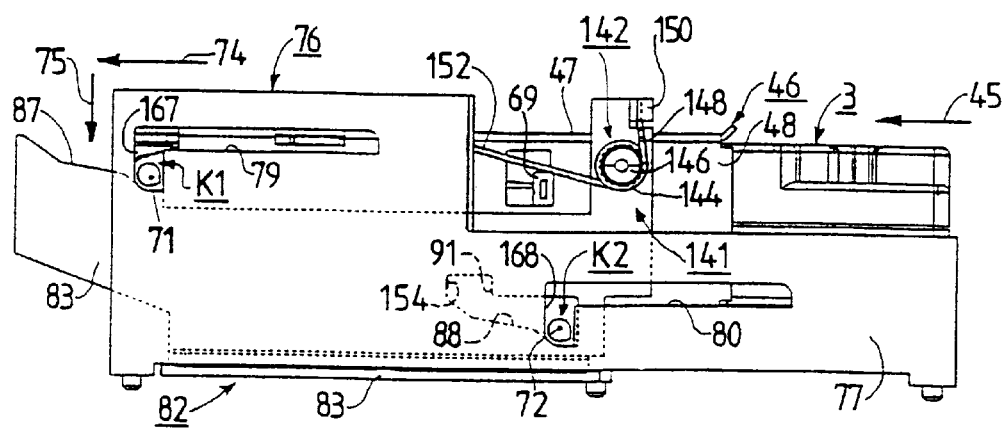
FIG. 23 shows the same part of the recording and reproducing device of FIG. 1 in a manner similar to FIG. 22, the holder means being in the operating position, and a cassette inserted in the holder means being also in an operating position.
Figure 24:
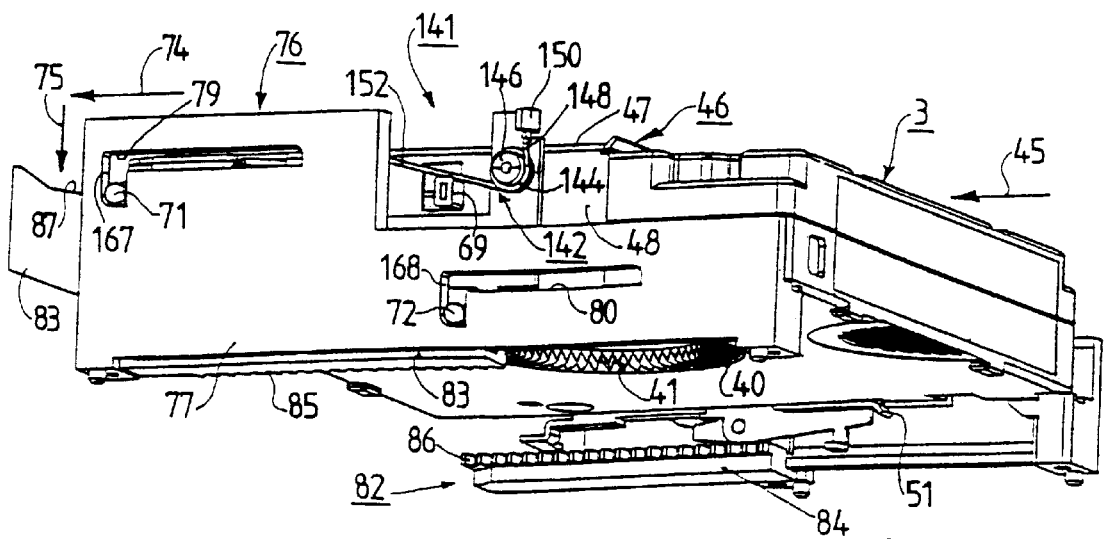
FIG. 24 is an oblique underneath view showing the same part of the recording and reproducing device of FIG. 1 as FIG. 23.
Figure 25:
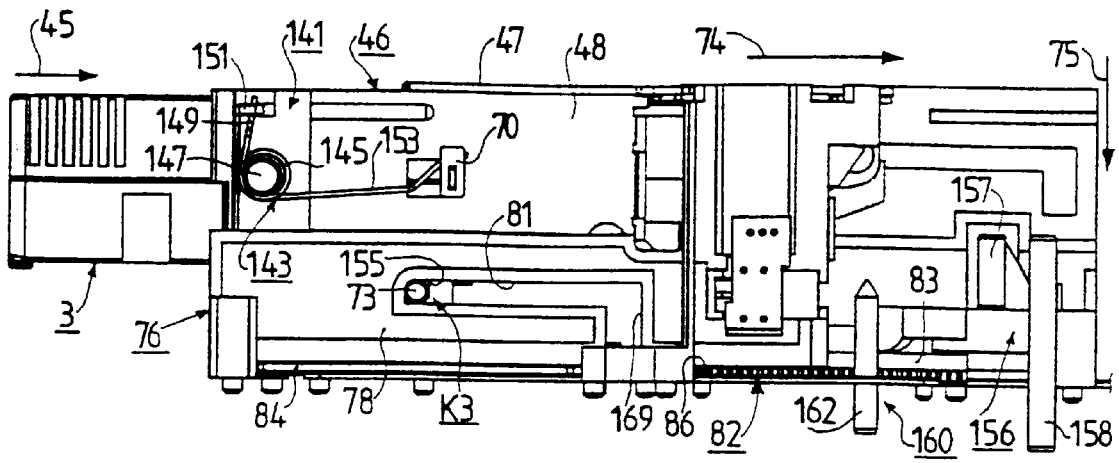
FIG. 25 is a side view showing a part of the recording and reproducing device of FIG. 1, which comprises the holder means including the actuating slides and the guide means for the holder means and, in addition, comprises positioning means and final positioning means for the cassette, the holder means being shown in the loading position, and a cassette being shown wholly inserted in the holder means.
Figure 26:
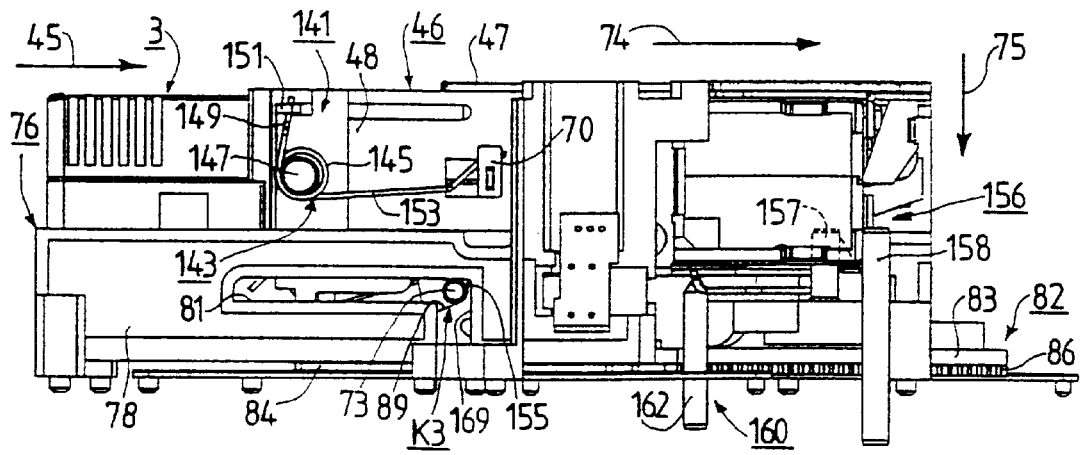
FIG. 26 is a view similar to FIG. 25, showing the same part of the recording and reproducing device of FIG. 1, the holder means being shown in an intermediate position occupied at an end of its movement in a first direction of movement.
Figure 27:
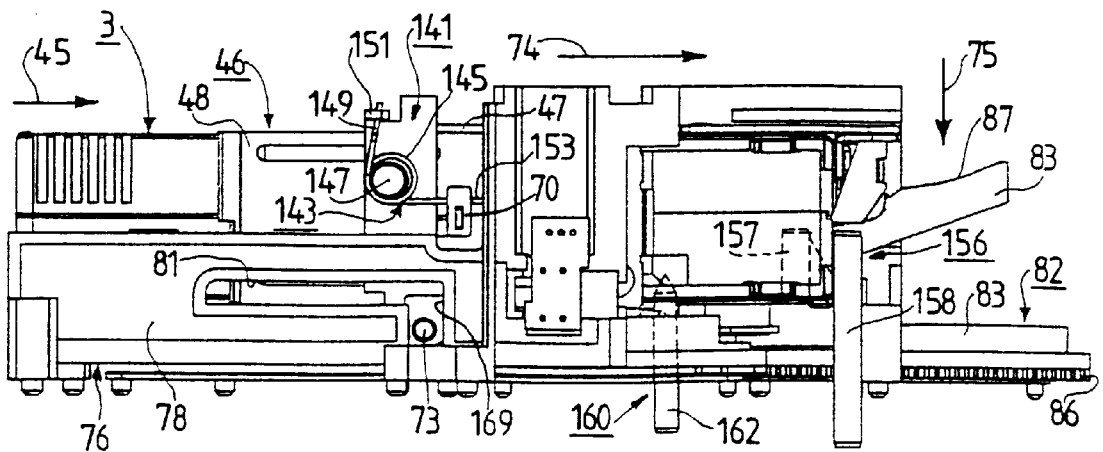
FIG. 27 is a view similar to FIGS. 25 and 25, showing the same part of the recording and reproducing device of FIG. 1, the holder means being shown in the operating position.

The cassette holder 46 is movable between a loading position shown, in FIGS. 1, 20, 21, 22 and 25, in which the cassette 3 can be inserted into the cassette holder 46, and an operating position, shown in FIGS. 23, 24 and 27, in which the cassette 3 inserted in the cassette holder 46 occupies its operating position. The cassette holder 46 is moved, in a manner known per se, along an L-shaped path of movement, the cassette holder 46 first being moved from its loading position in a first direction of movement 74 parallel to the direction of insertion 45, into an intermediate position, shown information FIG. 26, and, subsequently, it is moved into its operating position in a second direction of movement 75 towards the chassis 2, perpendicularly to the first direction of movement 74.

In order to obtain this direction of movement, the device 1, see FIGS. 1, 17, 18, 19 and 22 to 27, has guide means 76 including a first guide wall 77 and a second guide wall 78. The first guide wall 77 has a first L-shaped guide channel 79 and a second L-shaped guide channel 80. The second guide wall 78 has a third guide channel 81. The first holder pin 71 engages in the first guide channel 79. The second holder pin 72 engages in the second guide channel 80. The third holder pin 73 engages in the third guide channel 81. The three guide channels 79, 80 and 81 and the three holder pins 71, 72 and 73 guarantee a trouble-free guidance of the cassette holder 45.

The device 1 has actuating means 82 for moving the cassette holder 45, see FIGS. 1, 6, 7, 17, 18, 19 and 22 to 27. The actuating means 82 includes a first actuating slide 83 situated at one side with respect to the reel drive device 52, and a second actuating slide 84 situated at the other side with respect to the reel drive device 52, as is apparent from FIGS. 6 and 7. The two actuating slides 83 and 84 are guided so as to be slidable parallel to a sliding direction which corresponds to the direction of insertion 45 of the cassette 3 and to the first direction of movement 74 of the cassette holder 46. The first actuating slide 83 is integral with a first drive gear rack 85. The second actuating slide 84 is integral with a second drive gear rack 86. The first actuating slide 83 has a first cam surface 87 and a second cam surface 88. The second actuating slide 84 has a third cam surface 89. The first cam surface and the first holder pin 71 form a first cam-and-follower device K1, in which the first holder pin 71 forms a cam follower. The second cam surface 88, which is formed by a bounding surface of a recess 90 in the first actuating slide 83, and the second holder pin 72 form a second cam-and-follower device K2, in which 5 the second holder pin 72 also forms a cam follower. The third cam surface 89, which is formed by a bounding surface of a recess 91 in the second actuating slide 84, and the third holder pin 73 form a third cam-and-follower device K3, in which the third holder pin 73 also constitutes a cam follower. By means of 10 the cam surfaces 87, 88 and 89 and the holder pins 71, 72 and 73 used as cam followers, the cassette holder 46 is movable by moving the actuating slides 83 and 84.

As is apparent from the foregoing, each of the three cam-and-follower devices K1, K2 and K3 in the device 1 advantageously have only one cam surface 87, 88 or 89, respectively.

As is apparent from FIG. 1, the device 1 further includes a rotationally drivable take-up reel 92. The take-up reel 92 is rotationally drivable by means of a reel drive motor, not shown. The take-up reel 92 serves for taking up the magnetic tape 26 accommodated in the cassette 3. In order to wind the magnetic tape 26 onto the take-up reel 92, the take-up reel should be driven in the direction indicated by an arrow 93.

In order to enable the magnetic tape 26 contained in the cassette 3 to be wound onto the take-up reel 92 the magnetic tape 26 should first be brought to the take-up reel 92 with the aid of the coupling pin 27. For this purpose, the device 1 has a pull-out element 94, which is shown in FIGS. 1, 5, 14, 15 and 16. The pull-out element 94 is adapted to be coupled to the coupling pin 27. In order to enable the pull-out element 94 to be coupled to the coupling pin 27, the device 1 includes retaining means 95 adapted to detachably retain the pull-out element 94, the retaining means are movable between a standby position shown in FIGS. 1, 11, 12, 14 and 15, and an operating position, shown in FIGS. 5, 13 and 16. In the device 1, the retaining means 95 is mounted so as to be pivotable about a pivotal axis 96.

Figure 11:
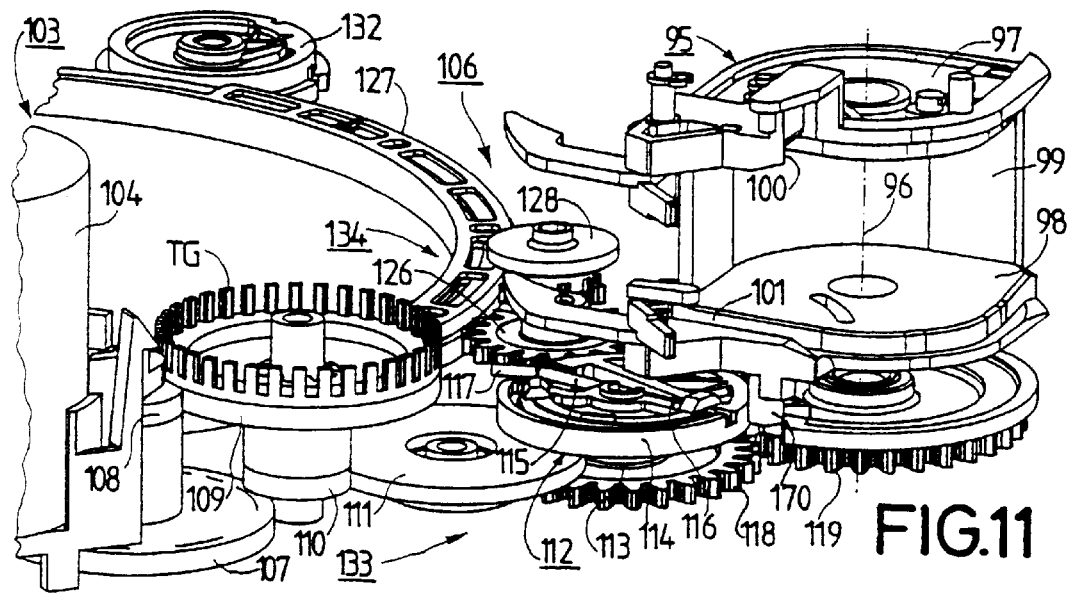
FIG. 11 is an oblique plan view showing a part of the drive means of FIGS. 6 and 7, the drive elements shown being represented in a situation in which the retaining means is in the standby position, and the holder means in the loading position.
Figure 12:
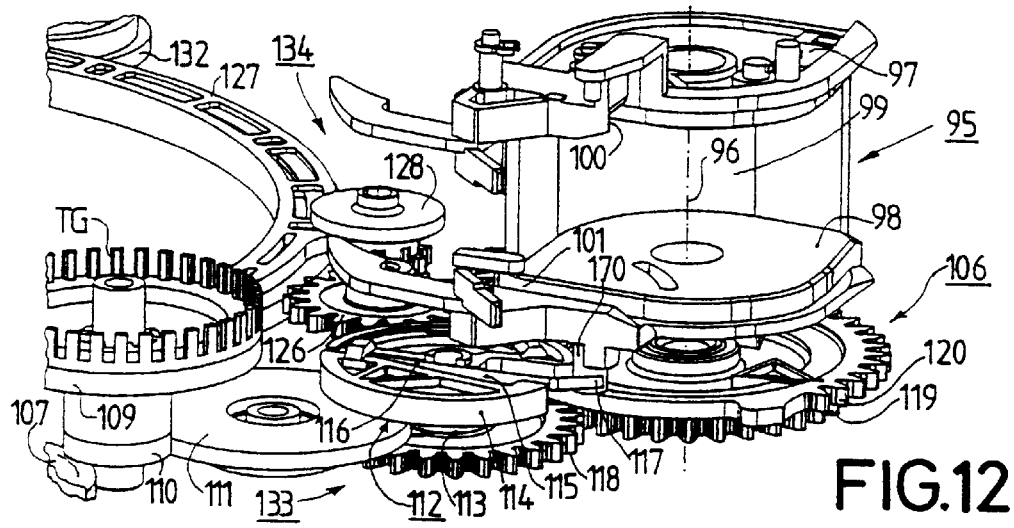
FIG. 12 shows a part of the drive means in a manner similar to FIG. 11, the drive elements shown being represented in a situation in which the retaining-means is in the standby position, and the holder means in the operating position.
Figure 13:
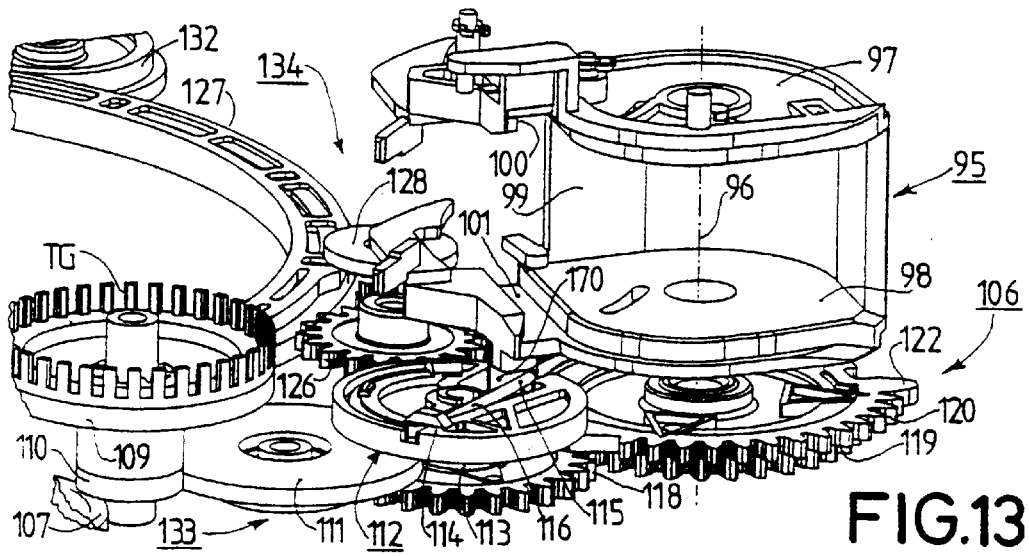
FIG. 13 shows a part of the drive means in a manner similar to FIGS. 11 and 12, the drive elements shown being represented in a situation in which the retaining means is in the operating position, and the holder means also in the operating position.
Figure 14:
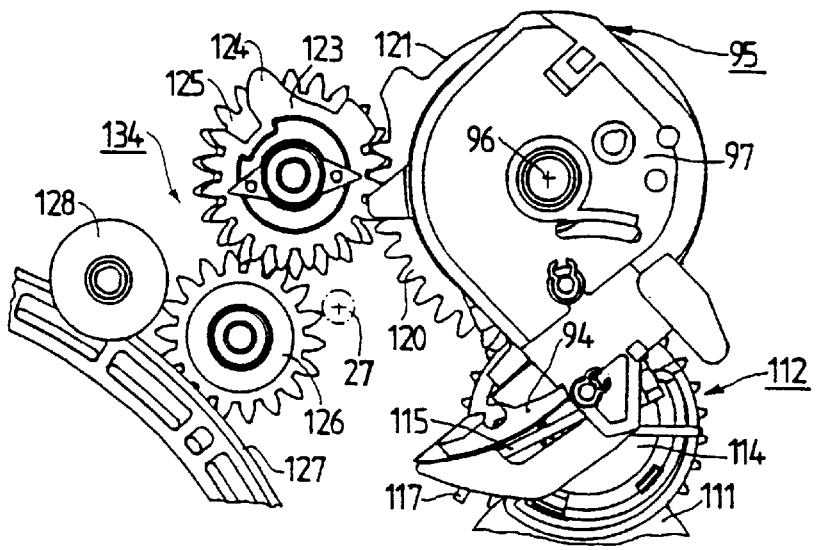
FIG. 14 is a plan view of the same part of the drive means as shown in FIGS. 8, 9 and 10, while , in addition, the retaining means is shown in the standby position.
Figure 15:
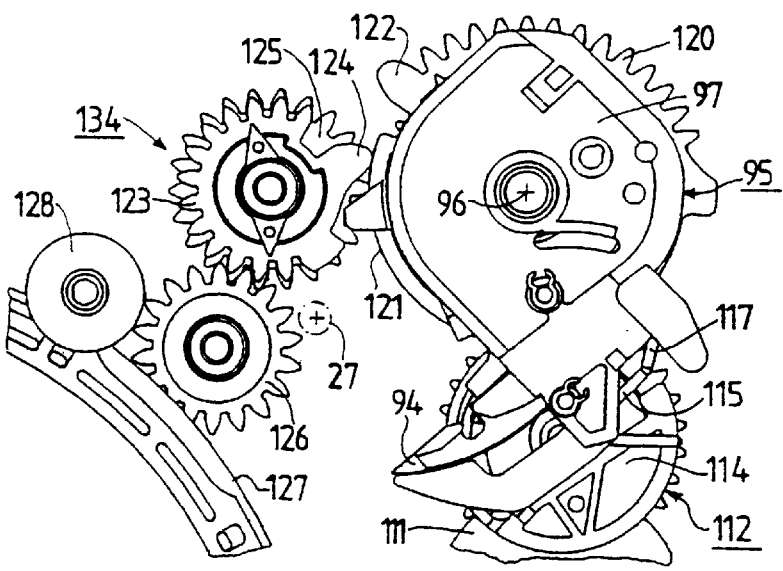
FIG. 15, in a manner similar to FIG. 14, shows a part of the drive means and the retaining means, which are shown in the standby position.
Figure 16:
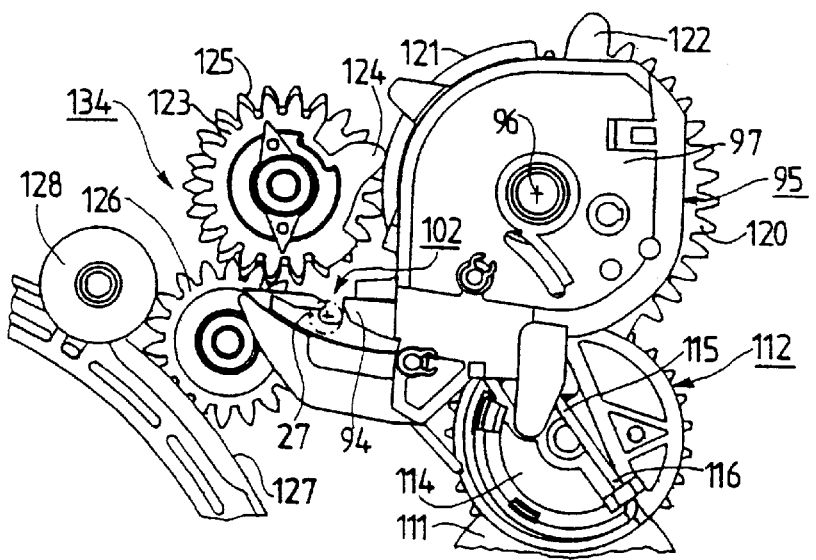
FIG. 16, in a manner similar to FIGS. 14 and 15, shows a part of the drive means and the retaining means, which are shown in the operating position.

The retaining means 95, as is apparent from FIGS. 11, 12 and 13, is substantially U-shaped and comprises two substantially planar retaining limbs 97 and 98 interconnected by a web 99. The pull-out element 94 is retained between the two retaining limbs 97 and 98, the pull-out element 94 being guided by guide elements, not shown, in respective guide channels 10 and 101 of the retaining means 95 and, in a manner not shown, the pull-out element 94 being held in a given initial position, i.e., in an area in which coupling with the coupling pin 27 is possible and, as a result of this, a pull-out assembly 102 consisting of the pull-out element 94 and the coupling pin 27 coupled to this element can be formed. Said pull-out assembly 102 is visible in FIG. 5 and also in FIG. 16, the coupling pin 27 being shown only diagrammatically as a dash-dot line in FIG. 16. It is to be noted that after the pull-out element 94 has been coupled to the coupling pin 27, the pull-out element 94 together with the coupling pin 27, i.e., said pull-out assembly 102, can be detached from the retaining means 95, which will not be described in any further detail here.

Figure 8:
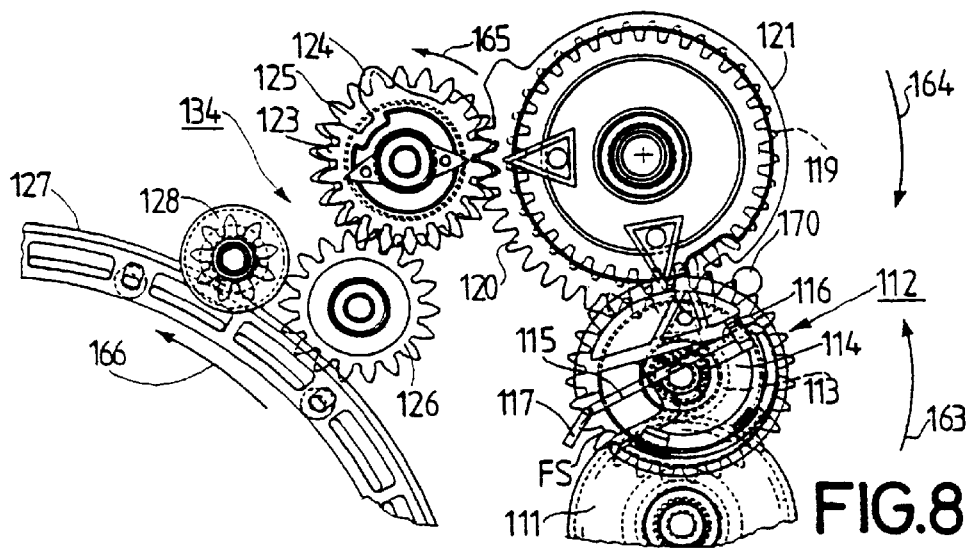
FIG. 8 is a plan view showing a part of the drive means of FIGS. 6 and 7, the drive elements shown being represented in a situation in which the retaining means is in the standby position, and the holder means in the loading positions.
Figure 9:
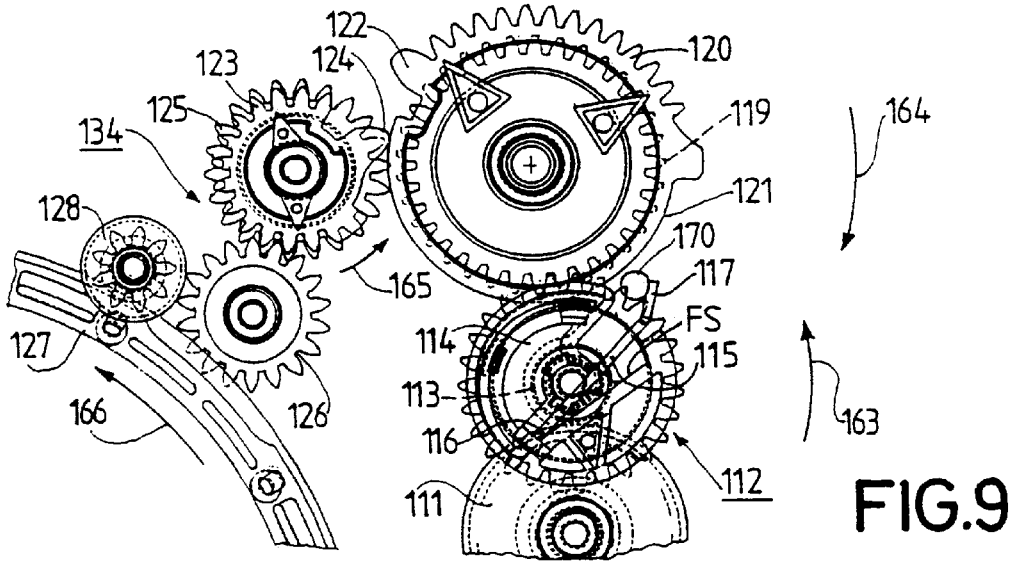
FIG. 9, in a manner similar to FIG. 8, shows a part of the drive means, the drive elements shown being represented in a situation in which the retaining means is in the standby position, and the holder means in the operating position.
Figure 10:
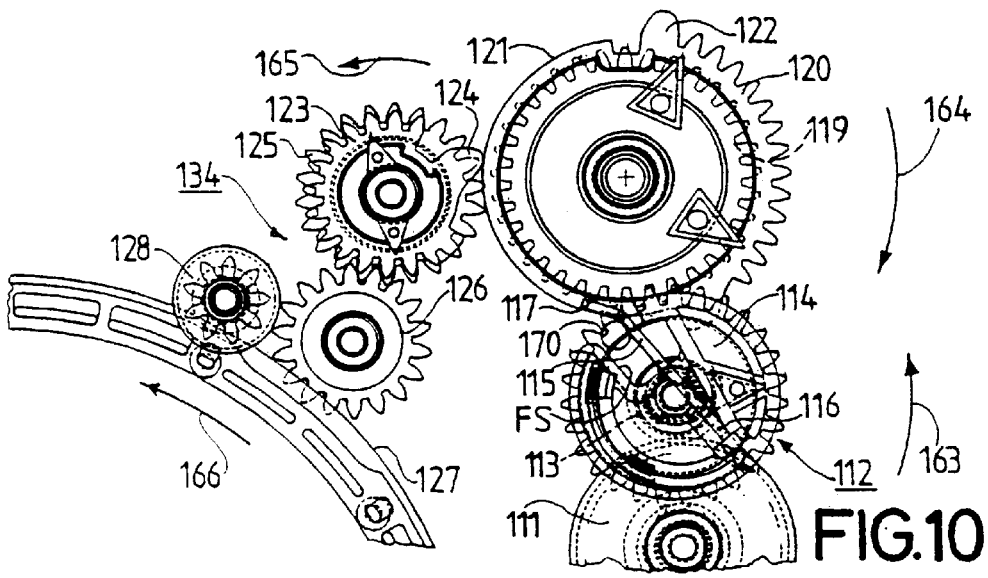
FIG. 10, in a manner similar to FIGS. 8 and 9, shows a part of the drive means, the drive elements shown being represented in a situation in which the retaining means is in the operating position, and the holder means in the operating position.

In order to enable both the cassette holder 46 and the retaining means 95 to be moved in an advantageous manner, the device 1 has drive means 103, which will be described hereinafter with reference to FIGS. 1, 6 to 16 and 28. The drive means 103 includes a motor 104 and a gear wheel transmission 106 which is drivable by a motor pinion 105 and whose construction is apparent from FIGS. 6 to 16. The gear wheel transmission 106 comprises the following transmission elements, i.e., gear wheels. The motor pinion 105 is in mesh with a first gear wheel 107 which is integral with a coaxial second gear wheel 108. The second gear wheel 108 meshes with a third gear wheel 109 having tacho-teeth TG of a photoelectric tacho-generator. The third gear wheel 109 is coaxial with a fourth gear wheel 110, which is in mesh with a fifth gear wheel 111. The fifth gear wheel 111 can drive a retaining-means drive gear wheel 112 having a tooth portion 113 and a mounting portion 114. The mounting portion 114 serves to carry, or hold, spring means 115 formed by a rod spring having one end fixed to the mounting portion 114 and another end 117 which serves to move the retaining means 95. The retaining-means drive gear wheel 112 is coaxial with a sixth gear wheel 118, which is in mesh with a seventh gear wheel 119, which is coaxial with the pivotal axis 96 of the retaining means 95. The seventh gear wheel 119 is integral with a coaxial eighth gear wheel 120 which has a toothless circumferential portion 121 and one extended tooth 122. The eighth gear wheel 120 cooperates with a ninth gear wheel 123, which also has one extended tooth 124. The ninth gear wheel 123 is coaxial with a tenth gear wheel 125. The tenth gear wheel 125 is in mesh with an eleventh gear wheel 126. The eleventh gear wheel 126 is in mesh with a ring-shaped gear wheel 127, whose teeth are not shown to simplify the Figures. The ring-shaped gear wheel 127 is rotatable with the aid of three bearing rollers 128, 129 and 130, which each have driving teeth 131 which are in mesh with the teeth of the ring-shaped gear wheel 127, as can be seen in FIGS. 8, 9 and 10 for the first bearing roller 128. The ring-shaped gear wheel 127 is in mesh with an intermediate gear wheel 132, which serves for direction reversal. The ring-shaped gear wheel 127 is directly in mesh with the second drive gear rack 86. The ring-shaped gear wheel 127 cooperates with the first drive gear rack 85 via the intermediate gear wheel 132 for direction reversal.

The gear wheel transmission 106 has a first transmission section 133 between the motor pinion 105 and the retaining-means drive gear wheel 112 and has a second transmission section 134 between the retaining-means drive gear wheel 112, and the two cassette holder drive gear racks 85 and 86, the second transmission section 134 including means for stopping a transmission of power from the retaining-means drive gear wheel 112 to the two drive gear racks 85 and 86 in the present case, said means comprises the eighth gear wheel 120 and the ninth gear wheel 123, which cause the transmission of power from the retaining-means drive gear wheel 112 to the two drive gear racks 85 and 86 to be discontinued when the toothless circumferential portion 121 of the eighth gear wheel 120 faces the ninth gear wheel 123.

When the cassette 3 is inserted by hand into the cassette holder 46, which is in its loading position as shown in FIGS. 1, 17, 18, 19, 20, 21, 22 and 25, the cassette 3 abuts against the sensing portions 63 and 64 of the two latching levers 59 and 60 at the end of the insertion movement, as a result of which, the latching hooks 65 and 66 are pivoted in such a manner that the latching hooks can no longer be blocked by the latching projections 67 and 68 which project from the two guide walls 77 and 78.

Moreover, locking means 135 connected to the cassette holder 46 are activated at the end of the insertion movement of the cassette 3 into the cassette holder 46. The parts of the locking means 135 are shown in FIGS. 17, 18, 20 and 21. The locking means 135 comprises a first locking lever 136, which is pivotably mounted on the cassette holder 46, and a second locking lever 137, which is also pivotably mounted on the cassette holder 46. At its free end, each of the two locking levers 136 and 137 has a locking hook 138 and 139, respectively. Spring means 140 act upon each of the two locking levers 136 and 137 and is formed by respective wire springs which urge the respective locking levers 136 and 137 towards a locking position of the respective locking lever 136 or 137, this locking position being shown in FIG. 21. The two locking levers. 136 and 137 are pivoted away from the upper holder wall 47 by a cassette 3 against the force of the spring means 140 during insertion of the cassette 3 into the cassette holder 46. As soon as the cassette 3 has been inserted wholly into the cassette holder 46, as is shown in FIG. 21, the locking levers 136 and 137 are pivoted into the locking positions under the influence of the force of the spring means 140, each of the locking levers 136 and 137 then engaging the respective locking recess 42 or 43 of the cassette 3 with its respective locking hook 138 or 139 and thereby engaging behind the relevant locking wall 44 of the cassette 3. Thus, the cassette 3 is locked in the cassette holder 46, and the cassette 3 can only be moved to a small extent out of its fully inserted position in a direction opposite to the direction of insertion 45.

At the end of the insertion of movement of the cassette 3 into the cassette holder 46, the cassette 3 abuts against the insertion limiting limbs 58 of the cassette holder 46, as a result of which, the cassette holder 46 performs a small movement in the direction of insertion 45 and the first direction of movement 74 which is parallel thereto. This small movement of the cassette holder 46 is detected by means of a photoelectric sensor, in response to which, the motor 104 of the drive means 103 is turned on via the sensor. As a result of this, the retaining-means drive gear wheel 112 is driven via the first transmission section 133 of the gear wheel transmission 106, and the ring-shaped gear wheel 127 is also driven via the second transmission section 134. As a result of this, the two drive gear racks 85 and 86 and, consequently, the two actuating slides 83 and 84 are moved in the first direction of movement 74, as a result of which the cassette holder 46 is moved from its loading position shown in FIGS. 1, 17, 18, 19, 20, 21, 22 and 25, into its operating position shown in FIGS. 23, 24 and 27, in which the cassette 3 occupies its operating position shown in FIG. 5.

Figure 18:
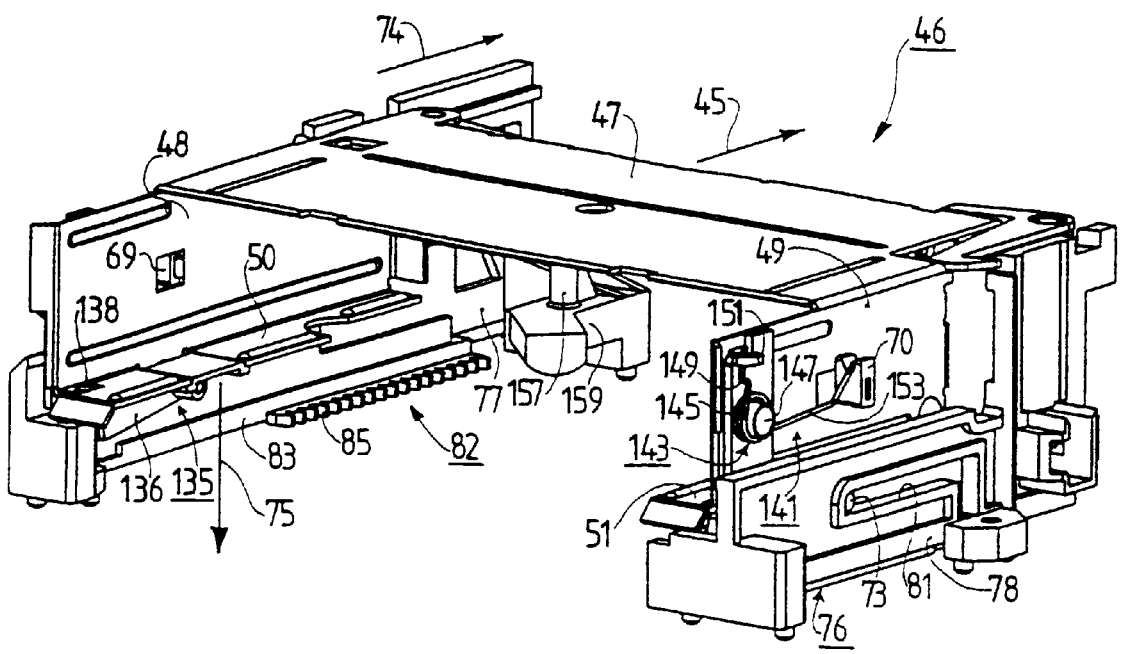
FIG. 18 shows the holder means of FIG. 17 in an oblique plan view.

Hereinafter, the means for moving the cassette holder 46 from its loading position into its operating position will be described in detail, reference being made particularly to FIGS. 22 to 27. In addition to the afore-mentioned cam surfaces 87, 88 and 89 and the holder pins 71, 72 and 73 used as cam followers, the actuating means includes spring means 141, which is shown in FIGS. 1, 17, 18, 19 and 22 to 27. The spring means 141 comprises two wire springs 142 and 143, which each take the form of a two-arm torsion spring. Each of the two wire springs 142 and 143 is fitted onto a pin-like cylindrical spring mount, 146 and 147, respectively, each of the spring mounts 146 and 147 being connected to a respective one of the actuating slides 83 and 84, and projecting laterally from the respective actuating slide 83 or 84. A first arm 148 or 149 of each wire spring 142 or 143 engages against a respective stop 150 or 151 of the relevant actuating slide 83 or 84 and the second arm 152 or 153 engages against the relevant stop 69 or 70 of the cassette holder 46. Each of the second arms 152 or 153 is angled in its area intended for cooperation with the respective stop 69 or 70 of the cassette holder 46, as can be seen in FIGS. 17, 18 and 22.

In the manner described in the foregoing, it is achieved that the spring means 141 acts between the two actuating slides 83 and 84 and the cassette holder 46, namely, in such a manner that during a movement of the actuating slides 83 and 84 in the direction of insertion of the two actuating slides 83 and 84, i.e., in the first direction of movement 74, the spring means 141 first causes the cassette holder 46 to move in the first direction of movement 74, and, subsequently, cause the cassette holder 46 to move in the second direction of movement 75. As a result of the provision of the springs means 141, it is also achieved that the spring means 141 permanently urges the cam followers, which cooperate with the respective single cam surfaces 87, 88, 89 of the three cam-and-follower devices K1, K2 and K3, i.e., the holder pins 71, 72 and 73 respectively, towards said respective single cam surface 87, 88 or 89.

As is apparent particularly from FIGS. 22 and 23, each single cam surface 87, 88 or 89 of each respective cam-and-follower device K1, K2 or K3 is slightly S-shaped. FIGS. 6, 22, 23, 25 and 26 further show that the second cam surface 88 and the third cam surface at one end, each have a surface portion 154 or 155 which extends transversely to the direction of insertion, i.e., transversely to the first direction of movement 74, against which the associated cam follower, i.e., the holder pin 72 or 73, is urged under the force of the spring means 141, when the cassette holder 154 is in its loading position.

As can be seen in FIGS. 1, 5, 6, 7 and 21 to FIG. 27, the device 1 includes positioning means 156, which, in the present case is formed by two positioning pins 157 and 158 which extend transversely to the first direction of movement 74. In the device 1, both the first positioning pin 157 and the second positioning pin 158 extend exactly parallel to the second direction of movement 75. However, it is alternatively possible that, for example, the second positioning pin 158 extends parallel to the front side wall 9 of the cassette 3 but extends at an angle with respect to the second direction of movement 75, i.e., is inclined with respect to the chassis 2. The first positioning pin 157 is carried by a mounting arm 159 which is integral with the first guide wall 77, this arm projecting from the guide wall 77 and extending over the intermediate gear wheel 132 for direction reversal. The second positioning pin 158 is connected directly to the chassis 2. The two positioning pins 157 and 158 are arranged and constructed for cooperation with the positioning means 15 of the cassette, i.e., with the two positioning walls 19 and 20 of the wedge-shaped recess 18, and the positioning portion 22 of the front side wall 9. The cassette-mounted positioning means 15 and the device-mounted positioning means 156 are arranged and adapted to position the cassette 3, in directions parallel to the bottom wall 8 thereof, with respect to the drive means for the magnetic tape 26, i.e., with respect to the reel-drive device 52 (see FIG. 28) for driving the supply reel 25 accommodated in the cassette 3. The cassette-mounted positioning means 15 and the device-mounted positioning means 156 are advantageously arranged and constructed in such a manner that during the movement of the cassette holder 46 from its loading position into its operating position, the cassette 3 is positioned with the aid of the cooperating positioning means 15 and 156 already at the end of the movement of the cassette holder 46 in the first direction of movement 74, and during the subsequent movement in the second direction of movement 75 before the cassette holder 46 has reached its operating position and before the reel drive device 52 enters into operative engagement, i.e., driving engagement, with the magnetic tape 26 of the cassette 3, i.e., before the drive teeth 56 of the reel drive device 52 come into mesh with the drive teeth 51 of the supply reel 25 of the cassette 3.

The device 1, see FIGS. 1, 5, 6, 7 and 21 to 27, in addition, includes device-mounted final positioning means 160. The device-mounted final positioning means 160 is now formed by two final positioning pins 161 and 162, of which the first final positioning pin 161 is arranged adjacent the intermediate gear wheel 132 for direction reversal, and the second final positioning pin 162 is arranged adjacent the eleventh gear wheel 126. The two final positioning pins 161 and 162 is connected directly to the chassis 2.

The cassette-mounted final positioning means 39, i.e., the two final positioning holes 37 and 38, i.e., the peripheral walls of these final positioning holes 37 and 38, are provided and constructed for the final positioning of the cassette 3 with respect to the reel drive device 52 in directions parallel to its bottom wall 8. The arrangement and construction of the cooperating final positioning means 39 and 160 is such that final positioning of the cassette 3 is possible when the cassette holder 46 is in its operating position and the reel drive device 52 is in driving engagement with the magnetic tape 26, the cassette-mounted positioning means 15 and the device-mounted positioning means 156 then being rendered inoperative, as will be described in further detail hereinafter.

As regards the reel drive device 52, which may also be referred to as magnetic tape drive means or record carrier drive means, it is to be noted that the reel drive device 52, as is apparent from FIGS. 1, 6 and 7, is disposed inside the ring-shaped gear wheel 127 in such a manner that the ring-shaped gear wheel 127 lies around the reel drive device 52 at the level of the ring-shaped gear wheel 127. This arrangement is advantageous because it results in a very compact construction, which can have a very small overall height, thus enabling the entire device 1 to have a minimal overall height.

The operation of the part of the device which is relevant in the present context will be explained hereinafter.

When the cassette 3 is inserted into the cassette holder 46, as already explained hereinbefore, the motor 104 of the drive means 103 is switched on with the aid of a photoelectric sensor. As a result of this, see FIGS. 8, 9 and 10, the retaining-means drive gear wheel 112 is driven by the gear wheel transmission 106 out of its initial position in a direction indicated by an arrow 163, as a result of which, the eighth gear wheel 120 is driven in a direction indicated by an arrow 164, the ninth gear wheel 123 and the tenth gear wheel 125 are driven in a direction indicated by an arrow 165, and the ring-shaped gear wheel 127 is driven in a direction indicated by an arrow 66. As a result of this, the rod spring 115, which can be driven by the retaining-means drive gear wheel 112, is moved, which initially does not have any consequences for the actuation of the retaining means 95. Since the ring-shaped gear wheel 127 is driven, the two actuating slides 83 and 84 are moved in the first direction of movement 74 via the two drive gear racks 85 and 86. The cassette holder (see FIGS. 22 and 25) is then moved in the first direction of movement 74 with the aid of the two wire springs 142 and 143, the holder pins 71, 72 and 73 being moved in the L-shaped guide channels 79, 80 and 81 in the first direction of movement 74 and being constantly held in engagement with the cam surfaces 87, 88 and 89 with the aid of the spring means 141.

The movement of the cassette holder 46 together with the cassette 3 therein in the first direction of movement 74, is stopped in that the cassette-mounted positioning means 15 enters into operative engagement with the device-mounted positioning means 156, i.e., in that the first positioning pin 157 comes into contact with the two positioning walls 19 and 20 of the wedge-shaped recess 18, and the second positioning pin 158 comes into contact with the positioning portion 22 of the front side wall 9 of the cassette 3, as is shown in FIG. 26. A return movement of the cassette 3 in a direction opposed to the first direction of movement 74 is limited with the aid of the locking means 135. In the intermediate position shown in FIG. 26, the cassette-mounted positioning means 15 and the device-mounted positioning means 156 cooperate with one another, the holder pins 71, 72 and 73, as is shown for the holder pin 73 in FIG. 26, being spaced at a small distance from the bounding wall 167, 168 or 169 of the respective guide channel 79, 80 or 81, these bounding walls are situated before the respective holder pins 71, 72 and 73 viewed in the first direction of movement 74.

As the ring-shaped gear wheel 127 is driven further and the two actuating slides 83 and 84 being consequently moved further, the spring means 141, i.e., the two wire springs 142 and 143, is driven further in the first direction of movement 74, as a result of which, the two wire springs 142 and 143 slide with their second arms 152 and 153 onto the stops 69 and 70 of the cassette holder 46, as can be seen in FIGS. 23, 24 and 27. As a result of this, the wire springs 142 and 143 exert a force directed towards the chassis 2 on the cassette holder 46 via the stops 69 and 70, this force ensuring that the holder pins 71, 72 and 73 are permanently held in engagement with the single cam surfaces 87, 88 and 89 on the two actuating slides 83 and 84, which, due to the continued movement of the two actuating slides 83 and 84, causes the cassette holder 46 together with the cassette 3 inserted therein to be moved in the second direction of movement 75, towards the chassis 2 and, consequently, towards the reel drive device 52. During this movement in the second direction of movement 75, the cassette-mounted positioning means 15 and the device-mounted positioning means 156 remain in operative engagement, so that, advantageously, the cassette 3 is positioned accurately from the end of the movement in the first direction of movement 74 and during the subsequent movement in the second direction of movement 75, thereby simply assuring that the drive teeth 56 of the reel drive device 52 and the drive teeth 41 of the supply reel 25 in the cassette 3 can properly mesh with each other.

Toward the end of the movement of the cassette holder 46 in the second direction of movement 75, the cassette-mounted final positioning means 39 and the device-mounted final positioning means 160 enter into operative engagement with each other, namely, in that the conical free end portions of the two final positioning pins 161 and 162 engage the final positioning holes 37 and 38, in the area of the bottom wall 8 of the cassette 3. During this engagement of the final positioning pins 161 and 162 into the final positioning holes 37 and 38 the cassette 3 is moved only a few tenths of millimeters, for example, 0.3 mm, in a direction opposite to the first direction of movement 74, as a result of which the cassette-mounted positioning means 15 and the device-mounted positioning means 156 are rendered inoperative, which is illustrated in FIG. 27 in that the area between the second positioning pin 158 and the positioning portion 22 of the front wall 9 of the cassette 3 is shown as a double line. In the operating position shown in FIG. 27 of the cassette holder 46 and the cassette 3 the cassette 3 is positioned by means of its final positioning holes 37 and 38 by means of the final positioning pins 161 and 162 in that the final positioning pins 161 and 162 engage against the peripheral walls of the final positioning holes 37 and 38 with their end portions of circular cross-section. As soon as the cassette holder 46 and the cassette 3 inserted therein have reached their operating positions the eighth gear wheel 120 and the ninth gear wheel 123 are disengaged because, see FIG. 9, the toothless portion 121 of the eighth gear wheel 120 then faces the ninth gear wheel 123. In this way, a further transmission of power from the motor 104 of the drive means 103 to the ring-shaped gear wheel 127 and hence to the actuating slides 83 and 84 is stopped. The extended tooth 124 of the ninth gear wheel 123, see FIG. 9, then engages against the toothless circumferential portion 121 of the eighth gear wheel 120, which precludes a backward rotation of the ninth gear wheel 123 in a direction opposite to the direction of rotation 165 and ensures that the cassette holder 45 is reliably held in its operating position.

As the retaining-means drive gear wheel 112 is further driven the free end portion 117 of the rod spring 115 enters into driving engagement with an actuating pin 170 which projects from the retaining means 95, as is shown in FIGS. 9 and 12. As driving of the retaining-means drive gear wheel 112 continues, this causes the retaining means 95 to be pivoted in the direction indicated by the arrow 164 via the actuating pin 170, as a result of which the retaining means 95 are pivoted from the standby position shown in FIG. 15 into the operating position shown in FIG. 16, the actuating pin 170 then engaging a clearance FS provided for this purpose in the mounting portion 114 of the retaining-means drive gear wheel 112, as can be seen information FIG. 10, which in the same way as FIGS. 8 and 9 also shows the actuating pin 170. The operating position of the retaining means 95 is defined by means of positioning means, not shown, for the retaining means 95. After the retaining means 95 have reached their operating position shown in FIG. 16, in which, the coupling pin 27, is coupled with the pull-out element 94 to form the pull-out assembly 102, the retaining-means drive gear wheel 112 is rotated slightly further, as a result of which the rod spring 115 whose free end portion 117 engages against the actuating pin 170 is tensioned, thereby ensuring that the retaining means 95 are reliably held in their operating position with the aid of the rod spring 115. As soon as the retaining-means drive gear wheel 112 has reached the operating position shown in FIG. 10, the motor 104 is switched off by means, not shown, the cassette 3 and the retaining means 95 then each being in their respective operating position.

As soon as the cassette 3 and the retaining means 95 have reached their operating positions, the pull-out assembly 102 formed by the pull-out element 94 and the coupling pin 97 can be moved to the reel hub 171 of the take-up reel 92 with the aid of the actuating means. For this purpose, the device 1 has a pull-out tape 172 having one end attached to the reel hub 171 of the take-up reel 92 and having its other end attached to the pull-out element 94, which pull-out tape, as can be seen in FIG. 1, being led to the reel hub 171 of the take-up reel 92 via a first tape guide roller arranged inside the retaining means 95, via a magnetic head 178, which is supported on actuator means 174 for an accurate tracking control, and via a second tape guide roller 176. Since the take-up reel 92 is driven in the direction of rotation 93, the pull-out assembly 102 is pulled away from the retaining means 95 with the aid of pull-out tape 172 and is guided to the reel flange 171 of the take-up reel 92 with the aid of guide means 177.

Subsequently, it is possible to record and reproduce signals, for example, data signals, on the magnetic tape 26 of the cassette 3 by means of the magnetic head 175, the magnetic tape 26 then being wound onto the reel hub 171 of the take-up reel 92 or onto the reel hub of the supply reel 25.

After a recording or reproducing process, the magnetic tape 26 can be returned into the cassette 3 in that the supply reel 25 is driven by means of the reel drive device 52. When the magnetic tape 26 has been returned completely into the cassette 3, and the coupling pin 27 has reached its correct coupling position in the cassette 3, the motor 104 can be switched on, the gear wheels of the gear wheel transmission 106 then being driven in the reverse direction of rotation, and the process described hereinbefore being effected in a reverse order, during which, first the retaining means 95 is moved back from the operating position into their standby position and, subsequently, the cassette holder 46 is moved back from its operating position into the loading position.

Figure 29:
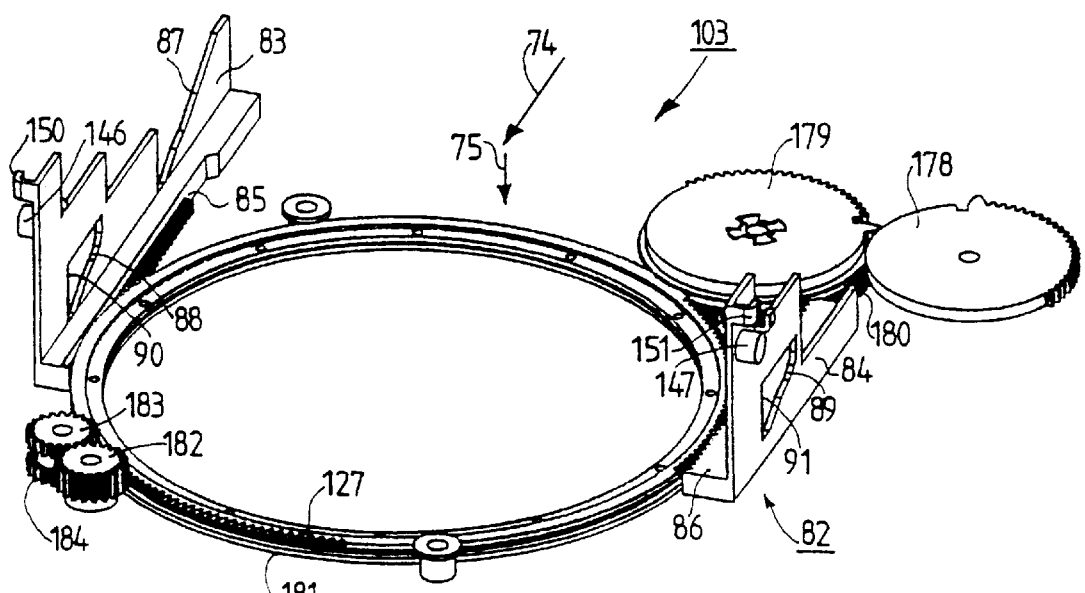
FIG. 29 shows a part of the drive means for moving the holder means of another storage device, namely, of a recording and reproducing device in accordance with another variant.

FIG. 29 shows a part of the drive means 103 of a variant of a storage device in the form of a recording and reproducing device, which differs from the drive means 103 of the device 1, as shown in FIG. 3, in that their construction is as described hereinafter.

In the drive means 103, as shown in FIG. 29, a first ring-shaped gear wheel 127, which can be driven by a motor, not shown, of the drive means 103 via some gear wheels, not shown, and via three gear wheels 178, 179 and 180, directly meshes with one drive gear rack 86, while the other drive gear rack 85 is in mesh with a second ring-shaped gear wheel 181 which is coaxial with the first ring-shaped gear wheel 127 and in the present case is disposed underneath the first ring-shaped gear wheel 127. The second ring-shaped gear wheel 127 is in driving engagement with the first ring-shaped gear wheel 127 via intermediate gear wheels for direction reversal. The intermediate gear wheels include a first intermediate gear wheel 182, having teeth extending distinctly beyond the first ring-shaped gear wheel 127 in an axial direction. The first intermediate gear wheel 182 is in mesh with a second intermediate gear wheel 183 and is situated at a higher level than the first ring-shaped gear wheel 127. The second intermediate gear wheel 183 is coaxial with a third intermediate gear wheel 184 which is disposed at the same level as the second ring-shaped gear wheel 181 and which is in mesh with the second ring-shaped gear wheel 181.

What is claimed is:

1. A recording and/or reproducing device for receiving a cassette, said cassette comprising a housing and a drivable record carrier accommodated in the housing, said record carrier being drivable by record carrier drive means through an opening in a bottom wall of the housing, wherein said recording and/or reproducing device comprises:

holder means for holding the cassette, said holder means being movable between a loading position, in which the cassette is loaded into the holder means, and an operating position, in which the cassette occupies an operating position;

actuating means coupled to the holder means, said actuating means being movable parallel to a direction of movement causing the holder means to be moved between the loading position and the operating position; and record carrier drive means for driving the record carrier of the inserted cassette when the holder means, together with the inserted cassette, occupies the operating position, characterized in that the actuating means comprises two actuating slides each extending parallel to the direction of movement, one of said two actuating slides being situated at one side with respect to the record carrier drive means, and the other of said two actuating slides being situated at the other side with respect to the record carrier drive means, and said recording and/or reproducing device further comprises drive means having a motor and a ring-shaped drive wheel drivable by the motor, the ring-shaped drive wheel being disposed between the two actuating slides of the actuating means, and the ring-shaped drive wheel lying around the record carrier drive means at the level of the ring-shaped drive wheel.

2. The recording and/or reproducing device of claim 1, wherein each of said two actuating slides comprises a gear rack, and said ring-shaped drive wheel comprises a ring-shaped gear wheel.

3. The recording and/or reproducing device of claim 2, wherein said ring-shaped gear wheel directly meshes with one gear rack, and meshes with said other gear rack through an intermediate gear wheel for direction reversal.

4. The recording and/or reproducing device of claim 2, wherein said ring-shaped gear wheel directly meshes with one gear rack, and said recording and/or reproducing device further comprises a further ring-shaped gear wheel for meshing with said other gear rack, said further ring-shaped gear wheel being coaxial with said ring-shaped gear wheel and being driven by said ring-shaped gear wheel through intermediate gear wheels for direction reversal.

* * * * *